United States Patent
Messano et al.

(10) Patent No.: US 6,785,512 B1
(45) Date of Patent: Aug. 31, 2004

(54) RADIO FREQUENCY RADIATION-FREE ENVIRONMENTS

(76) Inventors: Al Messano, 23 Downing Pl., Harrington Park, NJ (US) 07640; Alan Ross, 15 Seventeenth St., Norwood, NJ (US) 06748

( * ) Notice: Subject to any disclaimer, the term of this patent is extended or adjusted under 35 U.S.C. 154(b) by 405 days.

(21) Appl. No.: 09/706,699

(22) Filed: Nov. 7, 2000

(51) Int. Cl.$^7$ .............................. H04B 1/00; H04B 15/00
(52) U.S. Cl. ...................... 455/63.1; 455/106; 455/300; 455/301; 174/35 R
(58) Field of Search ................... 455/63.1, 63.2, 455/106, 300, 301; 428/688; 174/35 R, 35 MS, 35 TS (56) References Cited

U.S. PATENT DOCUMENTS

| | | | |
|---|---|---|---|
| 4,941,207 A | * 7/1990 | Maeda et al. ............... 398/119 |
| 5,124,889 A | 6/1992 | Humbert et al. ............ 361/424 |
| 5,235,492 A | 8/1993 | Humbert et al. ............ 361/818 |
| 5,271,056 A | 12/1993 | Pesola et al. ................. 379/58 |
| 5,401,562 A | * 3/1995 | Akao .......................... 428/211 |
| 5,668,070 A | 9/1997 | Hong et al. .................. 501/126 |
| 5,770,534 A | 6/1998 | Hong ............................ 501/1 |
| 5,855,988 A | * 1/1999 | Matsuo ....................... 428/195 |
| 5,889,230 A | 3/1999 | Katz .......................... 174/35 R |
| 5,916,486 A | 6/1999 | Angelopoulos et al. ..... 252/512 |
| 5,938,979 A | 8/1999 | Kambe et al. ............... 252/500 |
| 5,968,854 A | 10/1999 | Akopian et al. ............ 442/132 |
| 5,976,666 A | 11/1999 | Narang et al. .............. 428/138 |
| 6,030,708 A | 2/2000 | Ishibashi et al. ............ 428/441 |
| 6,043,769 A | 3/2000 | Rowe et al. .................... 342/4 |

FOREIGN PATENT DOCUMENTS

JP          2000022382    * 1/2000

* cited by examiner

*Primary Examiner*—Vivian Chin
*Assistant Examiner*—Tuan Tran
(74) *Attorney, Agent, or Firm*—Winston & Strawn LLP (57) ABSTRACT

The invention relates to a method of rendering telecommunication devices ineffective by creating a substantially radio frequency radiation-free environment. An interference generating pattern is provided adjacent the environment in a position between the environment and a source of radio frequency radiation signals so as to substantially reduce, or interfere with such signals thus preventing typical operation of the telecommunications devices therein. Preferably, the interference generating pattern is provided by applying silicon carbide as a coating or as part of a building material onto a structure to reduce attenuation by at least 20 to 50 decibels. Other aspects of the invention include the building materials that have the interference generating pattern associated therewith and the substantially radio frequency radiation-free environments that are created according to the methods disclosed herein.

25 Claims, 7 Drawing Sheets

800 MHz IGP

FIG.5A

2400 MHz IGP

RADIO FREQUENCY RADIATION-FREE ENVIRONMENTS

TECHNICAL FIELD

This invention relates to Radio Frequency (RF) radiation-free environments of various sizes which will reduce the signal strength of RF radiation therein. The net result will be a substantial signal strength reduction in order to create an RF-free environment so as to render wireless communications devices ineffective therein.

BACKGROUND OF THE INVENTION

Wireless communications devices such as cell phones and pagers have become essential to everyday life. While wireless communications devices are of great benefit, they also have become an intrusion of privacy and an annoyance. For example, when attending the theater, patrons do not wish to have the performance interrupted by a ringing cell phone or pager. In certain situations, RF radiation may also interfere with commercial or industrial processes such as testing, medical diagnostics, or general telecommunications. For these reasons alone, the desirability of an RF radiation-free enclosure is evident.

Furthermore, although preliminary results are inconclusive, ongoing research suggests that active wireless telecommunications devices such as cell phones, Personal Communication System (PCS) phones, satellite phones and two-way pagers pose a health risk to the consumer. Technology still under development will likely lead to yield new and unique ways of utilizing the electromagnetic (EM) spectrum. Currently, the EM environment encompasses applications such as analog and digital cellular telephony, wireless data, wireless Local and Wide Area Networks (LAN's and WAN's), satellite voice and data, long and short-haul microwave communications, to name but a few. These and future such applications would only proliferate further, thereby increasing the general risk of RF radiation to the public at large.

Thus, there is a need to solve the problems created by these transmissions, and the present invention provides RF radiation-free environments of various sizes which will reduce the signal strength of RF radiation or transmissions therein.

SUMMARY OF THE INVENTION

The invention relates to a method of rendering telecommunication devices ineffective, which comprises creating a substantially radio frequency radiation-free environment by providing an interference generating pattern ("IGP") adjacent the environment in a position between the environment and a source of radio frequency radiation signals so as to substantially reduce, or interfere with such signals thus preventing typical operation of the telecommunications devices.

The environment may be an enclosure having one or more walls and the IGP is provided on at least one wall. When the enclosure includes a ceiling and floor, the interference generating pattern may be provided upon at least one of the ceiling or floor. Generally, the IGP is provided as a paint, coating or building material onto both the walls and ceiling of the enclosure.

Another aspect of the invention relates to a radio frequency reducing building material that has an IGP associated with it in order to substantially reduce or interfere with radio frequency signals to prevent typical operation of telecommunication devices when the radio frequency reducing building material is positioned between a source of such signals and telecommunications devices. These building materials can include the IGP as a paint or coating on one or more surfaces of the material. The building material may be in the form of paper, cloth, plastic film, plywood, a cement or concrete structure, metal or plastic siding, glass, and wallboard or sheetrock. Alternatively, the IGP may be provided within the building material or beneath a protective covering or a paint or protective film so that the building material may be transported and handled without damaging the IGP.

The invention also relates to a substantially radio frequency radiation-free environment that includes an IGP adjacent thereto in a position between the environment and a source of radio frequency radiation signals so as to substantially reduce or interfere with such signals to prevent typical operation of telecommunication devices therein. Typically, the environment can be made by use of one or more of the building materials that are described herein.

When the enclosure is a building that includes exterior windows and doors, the IGP may be provided adjacent to or upon at least one of the windows or doors. To do so, the IGP may be provided upon a cloth, fabric or other building material that is located adjacent the windows or doors of the enclosure.

In another embodiment of the invention, the environment is a container or box having a top, bottom and sides each provided with the IGP.

The IGP is advantageously configured to attenuate radio frequency radiation in the range of 800 MHZ to 2400 MHZ, and to do so, includes compounds of silicon and carbon, such as silicon carbide. Advantageously, the IGP reduces the radio frequency signal by at least 20 to 30 dB. A plurality of IGPs can be superimposed to attenuate radio frequency radiation over the entire desired frequency range. For optimum performance or where a higher degree of shielding is required, multiple IGPs can be stacked or arranged throughout the thickness of the building material.

BRIEF DESCRIPTION OF THE DRAWINGS

Preferred embodiments of the invention are disclosed in the following drawing figures, wherein.

DETAILED DESCRIPTION OF THE PREFERRED EMBODIMENTS

The purpose of this invention is to create an RF-free environment. This RF-free environment has direct application to public, private and personal space, and is provided by an enclosure having certain materials that absorb, refract or interfere with the propagation of RF waves. In this regard, this invention is totally passive. It does not transmit any EM signal at all. This also means it does not have any RF-related health effects whatsoever.

This invention utilizes materials that are:

Environmentally safe

Non-carcinogenic

Chemically inert, non-toxic, non-combustible, non-corrosive and non-conductive

Naturally occurring

Inorganically based with no metal content

Readily available, economically inexpensive, and easy to apply

As a result, this invention will have a beneficial impact on public safety and health while eliminating the nuisance effects of commercial wireless devices. The enclosure which creates this RF-free environment has a myriad of other applications such as in testing of equipment, medical non-invasive scanning, and the like.

Figure 1:
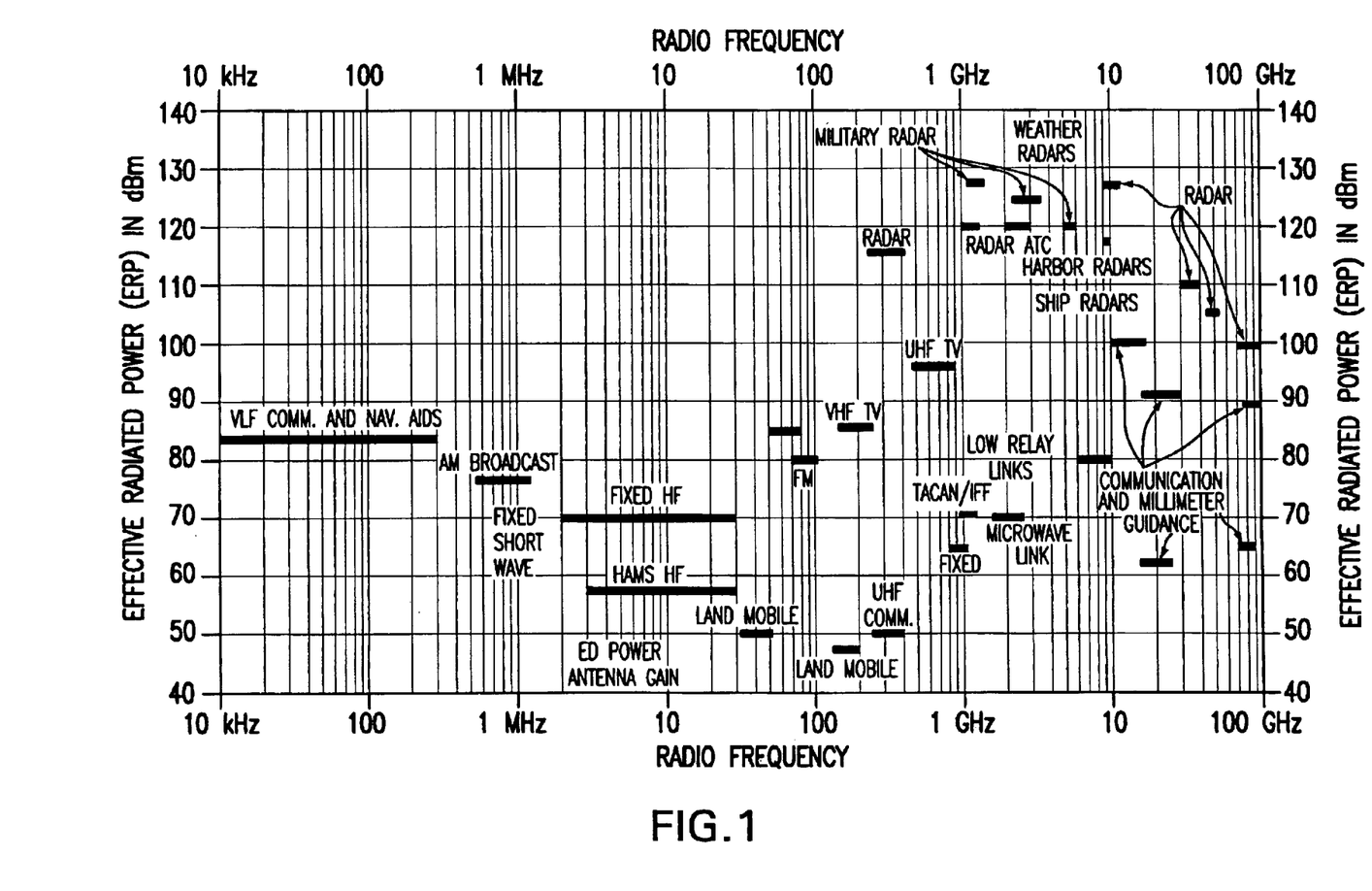
FIG. 1 is a schematic diagram of the RF portion of the electromagnetic spectrum.

The EM spectrum ranges from very low frequencies, such as 60 cycles per second (called Hertz, abbreviated Hz) of power lines to very high frequencies, such as 40 billion cycles per second (called Gigahertz, abbreviated GHz) of microwave communications systems. The frequencies of lasers and optical devices are almost a million times greater in frequency. The RF portion of the EM spectrum is shown in FIG. 1.

This invention directly targets part of the so-called RF portion of the EM spectrum utilized by commercial wireless carriers. This RF spectrum ranges roughly from 800 MHZ to 2400 MHZ. These techniques also have direct application to other portions of the EM spectrum as well, such as any frequency in the range of 10 KHz to 100 GHz.

Figure 2A:
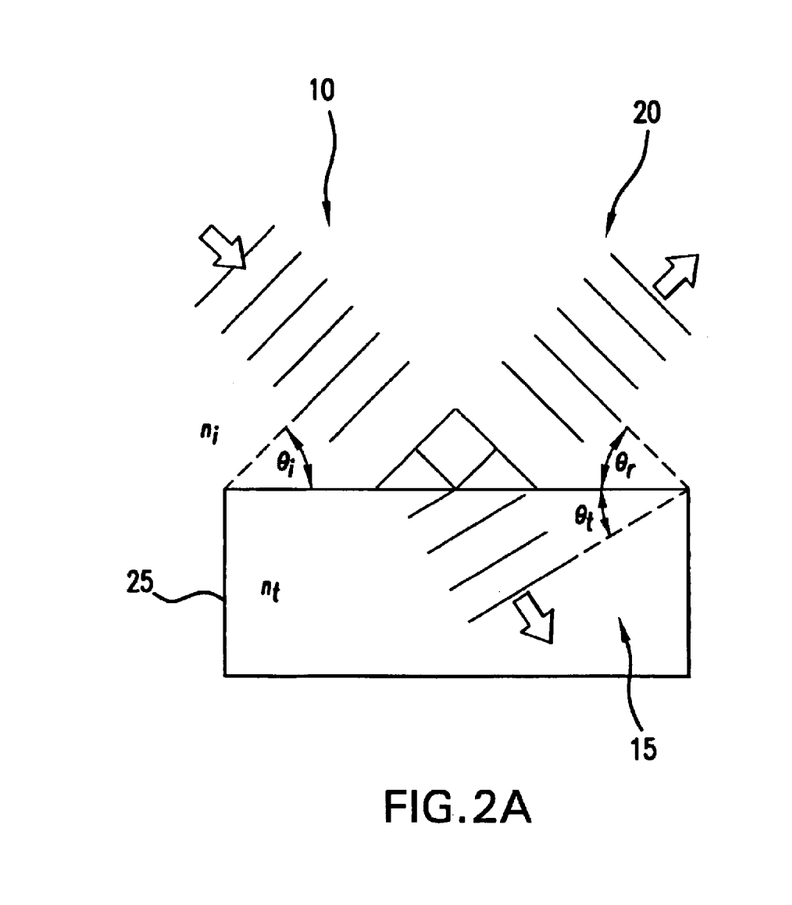
FIGS. 2A and 2B are schematic representations of the effects on waves when a solid is encountered.
Figure 2B:
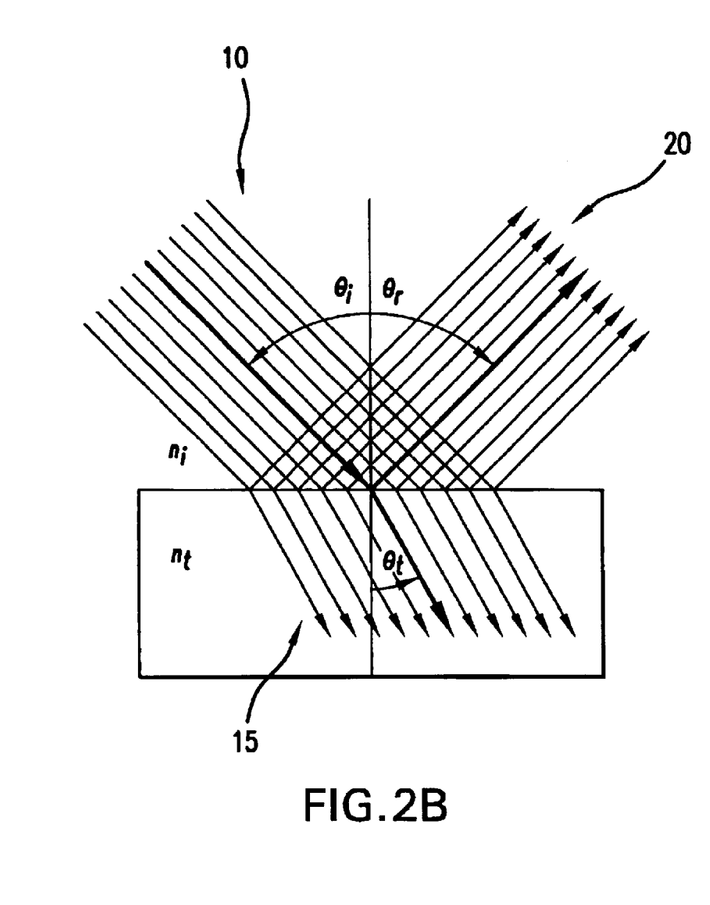

In order to reduce EM radiation and create an EM radiation-free environment, the invention utilizes the principles of wave effects on the surface of a solid. FIG. 2A illustrates these wave effects when an incident wave 10 is directed at angle $\theta_i$ against the surface of a solid 25. Part of the wave, called a transmitted wave 15, passes into the solid while another part of the wave 20 is reflected from the surface of the solid, at angle $\theta_r$. As shown in FIG. 2B, the transmitted wave 15 is also called a refracted wave. By reflecting a greater portion of an EM wave, a much smaller portion is transmitted or refracted. With a sufficient reduction of the wave strength signal, as explained below, telecommunication devices that are placed or located within the environment become inoperative.

A basic principal of physics reveals the relationship between the frequency and the wavelength of an EM wave:

$$C=\text{Wavelength} \times \text{Frequency}$$

where C=the speed of light

Figure 3A:
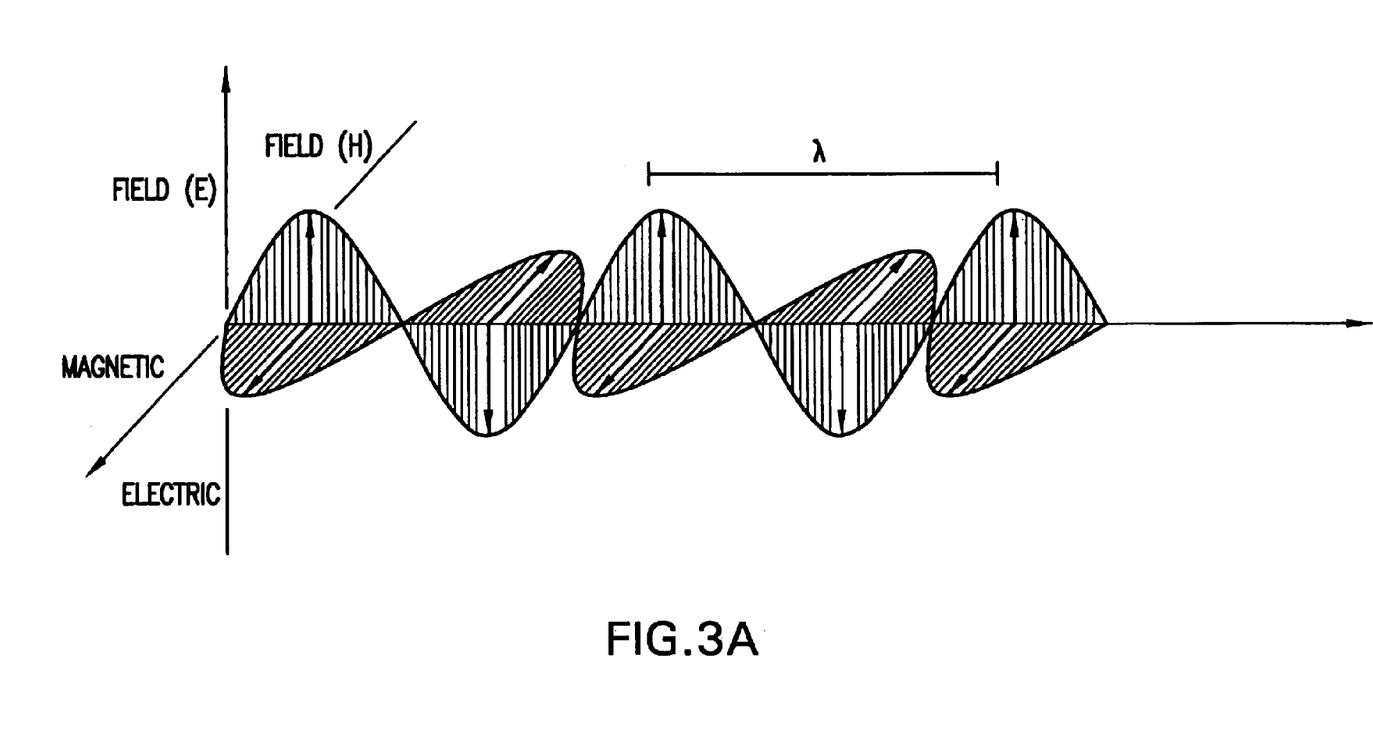
FIGS. 3A and 3B are graphical and schematic illustrations of the relationship between wavelength and frequency.
Figure 3B:
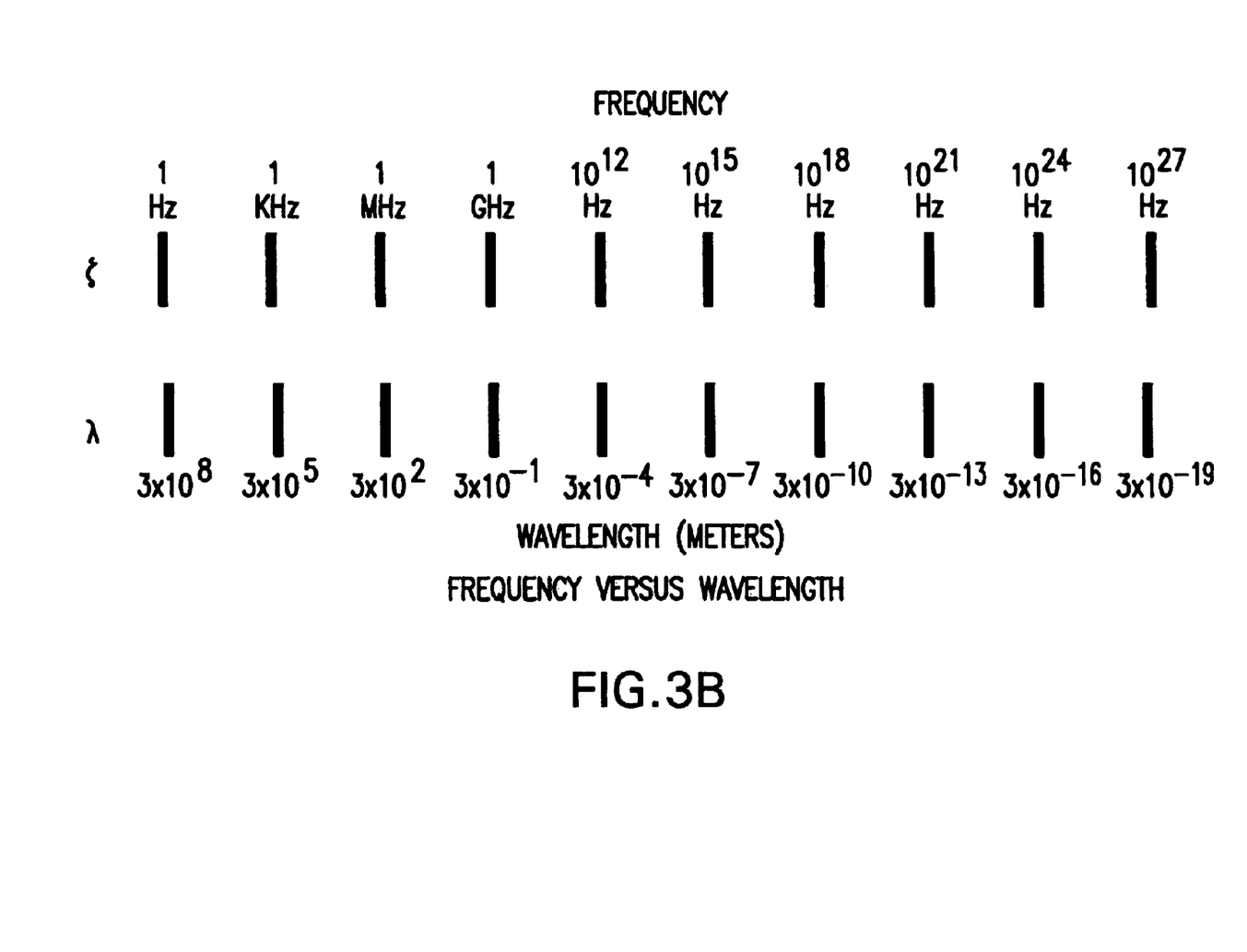

This calculation indicates that the wavelength of an 800 MHZ EM wave is 14.76 inches (375 mm) and the wavelength of a 2400 MHZ EM wave is 4.92 inches (125 mm). FIG. 3A shows the relationship between electric and magnetic fields in a wave along with the definition of wavelength, while FIG. 3B shown the relationship between some selected frequencies and their respective wavelengths according to the above equation.

The materials to be used to create the substantially RF radiation-free environment are in the family of carbon-based silicates. This invention preferably uses the application of silicon carbide or (SiC), a common inorganic material, to an enclosure to reduce, or attenuate, RF signal strength by absorption, reflection, refraction or interference generation. Other compounds of carbon and silicon may be used, if desired. The most preferred material, SiC, is readily available. It has been found in outer space as intergalactic dust grains. This dust ranges in size from 0.01 microns (micrometers or one-millionth of a meter) to 10 microns. These grains have been proven to have an effect on signals with frequencies (or, conversely, wavelengths) in certain portions of the EM spectrum. The size of the grain and the structures constructed with such grains determines what portion of the EM spectrum is affected. Since wavelength is inversely proportional to frequency, lower parts of the EM frequency spectrum with a longer wavelength would be affected by a larger grain size. Since the RF portion of the EM spectrum is of a relatively lower frequency (800 MHZ to 2400 MHZ), a grain size of about 25 to 100 microns would preferably be used. Additionally, these materials are utilized to create physical structures or patterns which will more closely approximate the wavelength of RF spectrum under consideration.

Calculations indicate that, depending on the thickness of the material used, SiC generates significant reduction in signal strength, called attenuation, as well as significant reflection and reflection effects (called phase changes) for the portions of the RF spectrum under consideration. Given the following properties of SiC materials:

Permeability=400×Pi

Permittivity=2.5 to 12×Permittivity of Free Space

Conductivity=approximately zero

Then the attenuation constant, Alpha, can be calculated as follows:

$$\text{Alpha}=((2\times(Pi)\times 8.686)/\text{wavelength})\times(\text{Square root of ((Relative Permittivity/Relative Permeability))}/2)$$

Depending on the thickness of the material and the wavelength in question, an attenuation of between 2 and 50 decibels (abbreviated dB) would be realized. A 50 dB reduction would lower the signal strength to a level of one hundred thousandth of its original value, thus effectively eliminating the signal. A reduction of at least 20 to 30 dB is often sufficient in order to create a substantially RF radiation-free environment.

Specifically, these materials are applied in a manner as to create a diffraction grating pattern or IGP that is comparable with the wavelengths of the RF spectrum under consideration. The physics of diffraction gratings are governed by the Grating Equation:

$$\text{Line Spacing} \times \text{Sin}(2 \times \text{Grating Angle}))=\text{Wavelength}$$

The grating angle, also called blaze angle, may be calculated to be 45 degrees so that the grating spacing will be equal to the wavelength of the RF frequency in question.

| Frequency | Wavelength | Grating Angle | Grating Spacing |
|---|---|---|---|
| 800 MHz | 375 mm | 45° | 375 mm |
| 2400 MHz | 125 mm | 45° | 125 mm |

The 45-degree pattern can then be applied stand-alone or back-to-back to create either a sawtooth or a triangular repeating pattern. This should provide an easily manufactured repeatable pattern that offers multiple reflective surfaces to the incident wave. Multiples of 45° can instead be used, if desired.

Figure 4:
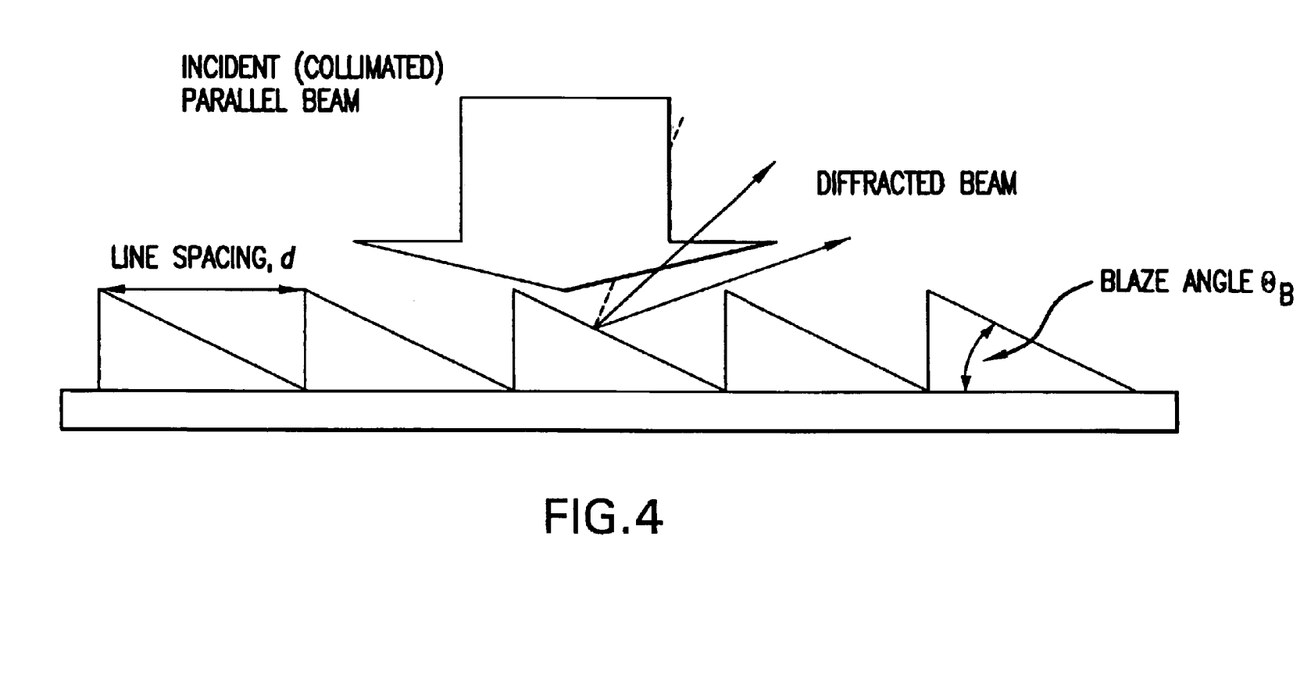
FIG. 4 is an illustration of a diffraction grating.

FIG. 4 illustrates the operation of a diffraction grating. A plurality of saw-tooth gratings, spaced at a distance d and having blaze angle $\theta_1$ are provided on the surface. An incident or collimated parallel beam directed at the grating is diffracted away from, rather than through, the surface.

Figure 5A:
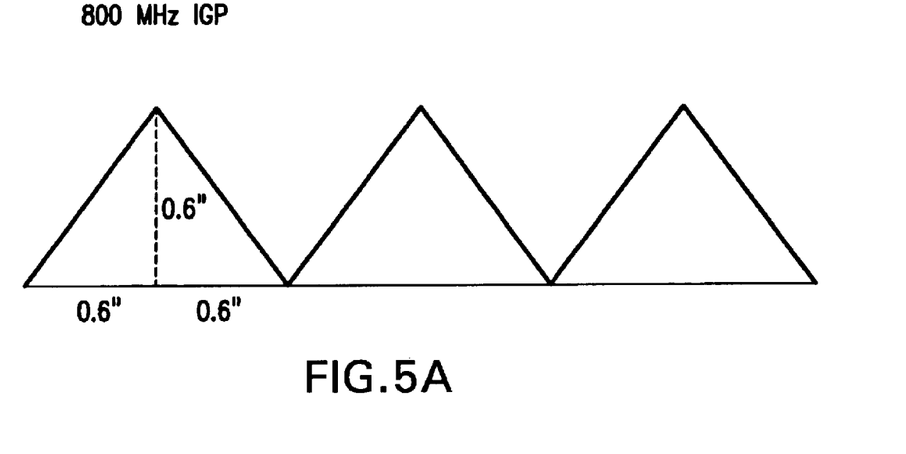
FIGS. 5A and 5B illustrate two IGPs for different EM frequencies.

The diffraction grating can be applied in a periodic pattern. The periodicity of the pattern will be determined by the frequency and, therefore the wavelength of the RF frequencies under consideration. The period may be based on either the full wavelength or the quarter-wavelength of the frequency under consideration to create the IGP. The net result is to create a series of "double slits" to act as additional interference generators. Since the range of commercial wireless communications is considered to be between 800 MHZ and 2400 MHZ, the highest frequency is three times the lowest frequency. Therefore, in this example, the grating pattern will repeat every fractional wavelength, such as every three (3) quarter-wavelengths of the higher frequency. As shown in FIG. 5A, the calculated geometry for a triangular pattern is such that the repeating triangle is approximately 1.23 inches long and 0.61 inches high for 2400 MHZ frequencies and 3.69 inches long and 1.2 inches high for 800 MHZ. A three-to-one ratio is observed. Quarter-wave patterns will yield smaller IGP structures (by a factor of one-half to one-fourth, respectively) than will half-wave or full-wave patterns.

The larger 800 MHZ patterns may be approximated by repeating groups of three (3) 2400 MHZ patterns. Each 800 MHZ pattern will be a triangle approximately 1.23 inches long and no taller than 0.61 inches. Depending on the application method, there may be a 3.69 inch long "slit", with no imbedded IGP, between the groupings of three (3) 800 MHZ patterns. This slit will be another interference (via diffraction) source.

Figure 5B:
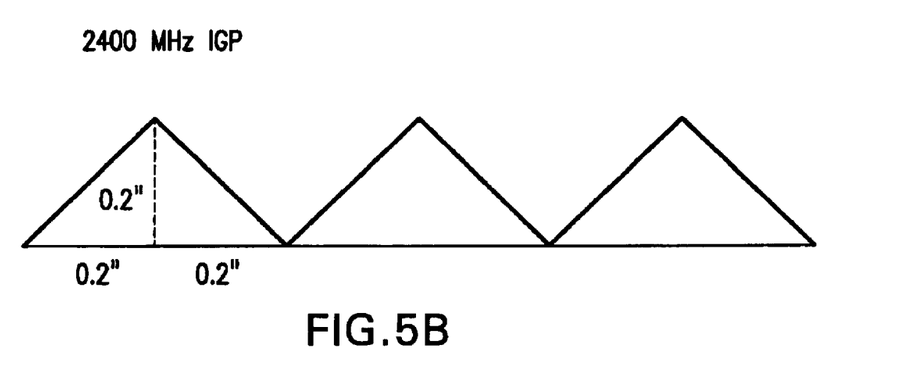

By attenuating the wavelength and creating a given fractional wavelength design, various designs can be achieved. Similar calculations are made for the 2400 MHZ frequency, with the results shown in FIG. 5B. For this frequency, the repeating triangle is approximately 0.2 inches high and 0.4 inches long.

Figure 6A:
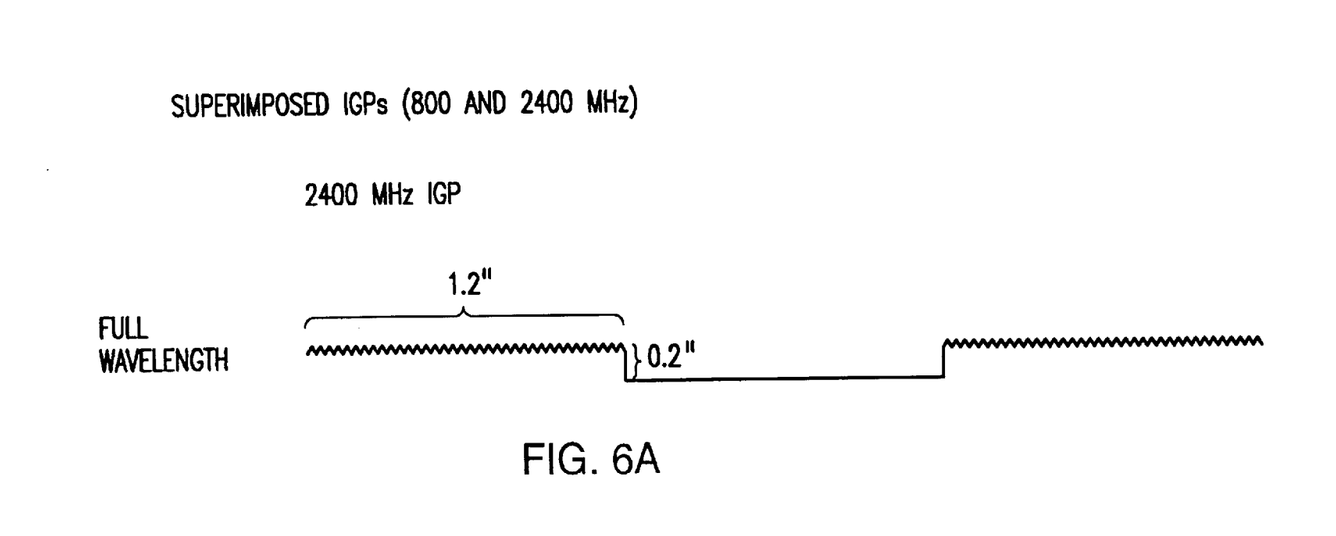
FIGS. 6A and 6B illustrate two superimposed IGPs for two different EM frequencies.
Figure 6B:
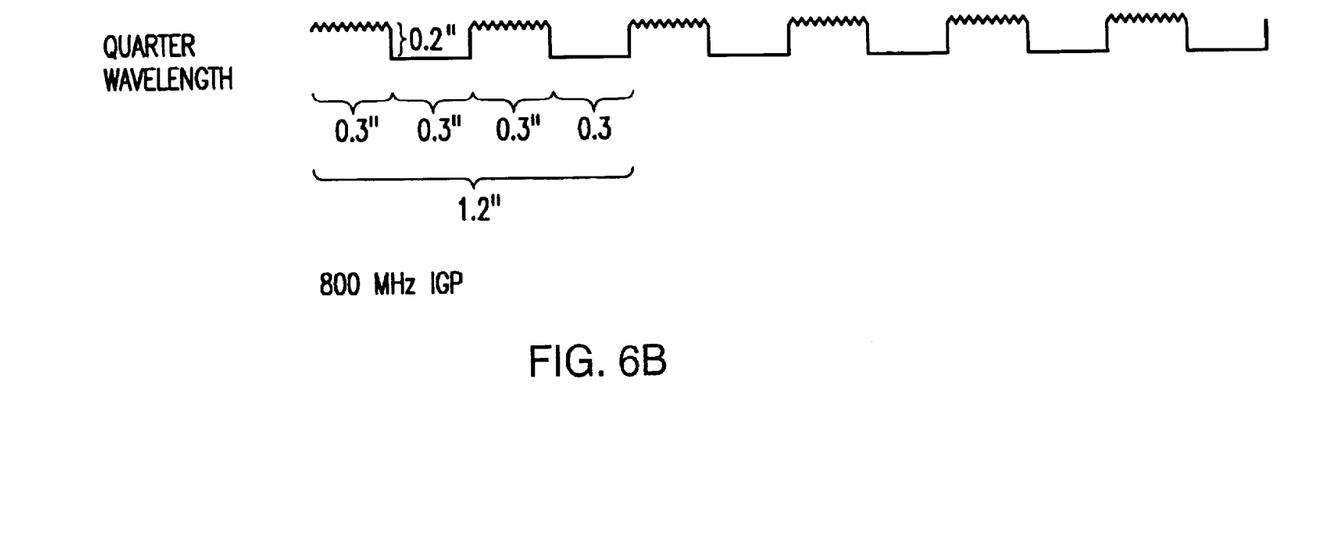

FIG. 6 illustrates how the IGPs need to be overlaid or superimposed to attenuate both the 800 MHZ and 2400 MHZ EM waves. The illustrated patterns would repeat along the entire length of the building material. In addition, the IGP can be provided in multiple layers for applications where greater shielding security or more critical shielding is needed. For certain materials, the IGP can be provided within the thickness of the material, either in layers or in different positions throughout the depth of material to provide greater interference with the signals.

For the case of commercial wireless devices, the grating pattern is designed to repeat every 3.69 inches in order to accommodate the entire 800 MHZ through 2400 MHZ frequency range. The IGP will maximize the interference generated for these selected frequencies. If desired, this technique may be optimized for whatever frequency or range of frequencies is under consideration. Depending on the frequencies selected and the application, the IGP may be built either horizontally or vertically into then building material or upon the structure. In the far field of the EM wave, the IGP will typically appear as a surface roughness feature on whatever substrate is used.

The present invention utilizes a combination of:
attenuation properties of selected materials
reflection and refractive properties of selected materials
creation of far-field surface roughness
building of larger-scale IGPs.
in order to create substantially RF-free environments which may be optimized for specific frequencies.

A number of different techniques can be used to apply these silicon and carbon materials to or upon the enclosure to create either a fixed or mobile RF-free environment. Consequently, the enclosure may be used in a variety of applications. Various techniques for applying these materials are now described.

Coatings and Paints

The SiC materials may be blended with commercial grades of coatings or paints. These may then be applied on wallboard or other construction materials in the appropriate concentrations to form the IGP. Typically, spray nozzles are utilized to apply the paint or coating material and create the IGP embedded within the deposited coating or paint material. To facilitate application, the spray nozzles can be configured to deposit the appropriate IGP for reduction of the particular wavelengths or frequencies under consideration. The net effect will be a coated or painted surface that will be identical to a normal surface except that it will be textured with the IGP in order to reduce or eliminate the transmissions of RF signals therethrough.

This application technique can be used for both an already coated or painted surface as well as for an uncoated or non-painted surface. This application technique may be utilized for the construction of new buildings as well as for existing buildings. Since the material will be blended with both interior and exterior quality coatings or paints, the application may be used on either interior or exterior surfaces, or both.

In this embodiment, the enclosure can be made of any ordinary construction material, such as wood, cement, brick, cinder block, metal or plastic, fabric, cardboard or the like. The enclosure may be a container or box, or a more substantial construction such as a theater or other building. As RF signals are usually generated from a source such as a tower, when the enclosure is a building, the side walls and the roof or ceiling of the enclosure are typically painted. It is not necessary to paint the floor although this may be advantageous for certain applications. When the enclosure is a box or other portable item, all sides as well as the top and bottom are painted. Of course, the coating can be applied to the inside or outside of the enclosure, and it can be covered by other finishing materials, such as siding, wall coverings, etc.

Wallboard or Other Construction Materials

The IGP may be incorporated onto the surface of wallboard, sheetrock or other construction materials such as siding, roofing, paneling, tar paper, cardboard, plastic wrapping and the like during the manufacturing process. Again, the materials can be applied by spray nozzles to create the IGP. An adhesive may be utilized as the binding component, and the SiC material applied as a dry powder which is adhered to substrate by the adhesive.

The manufactured wallboard (or other construction materials) can then be shipped with the IGP embedded on or inside it. In this case, the appropriate handling care must be taken with this wallboard so as to not damage the IGP. A protective coating of clear paint or a protective layer of a plastic film can also be applied to protect the IGP during transport and handling of the building material. The wallboard, sheetrock or other construction or building material, may then be used in the construction process to create the RF-free enclosure.

Drapery and Clothing

Since the IGP may be constructed in a flexible format, existing manufacturing processes may be used to essentially "embroider" the IGP into a cloth or fabric used for wall coverings, draperies for windows or even for clothing. It is not anticipated that the IGP-embedded clothing material would be part of an everyday lifestyle, but these materials could be used in high RF-radiation environments where the safety of the wearer is paramount.

Such IGP-embedded wall and window coverings may be used to construct RF-free environments in both new and existing buildings, or to reinforce the RF protection of a building that has been painted with RF shielding materials.

Window Coverings

IGPs for window applications can also be provided. These applications will utilize materials that are transparent or semi-transparent. The IGPs may be created on a plasticized substrate, such as polyacetate, or may be a self-adhesive film.

As such, the IGP can be applied directly to existing windows or may be applied to window as part of the manufacturing process. A semi-transparent, or even opaque, application will have the additional benefit of attenuating visible light as well. This approach is useful in buildings where shade as well as an RF-free environment is desirable.

The coating can be applied directly onto glass or onto a glass or plastic panel that is placed between two sheets of glass.

The following claims are not to be limited solely to the preferred embodiments that are disclosed in the specification, but they should be construed to cover all equivalent or reasonable modifications that can be made by one of ordinary skill in the art.

What is claimed is:

1. A method of rendering telecommunication devices ineffective, which comprises creating a substantially radio frequency radiation-free environment by providing a non-conductive interference generating pattern that is or includes a diffraction grating adjacent the environment in a position between the environment and a source of radio frequency radiation signals so as to substantially reduce, or interfere with such signals by attenuation of signal wavelength thus preventing typical operation of the telecommunications devices.

2. The method of claim 1 wherein the environment is an enclosure having one or more walls and the interference generating pattern is provided on at least one wall.

3. The method of claim 2 wherein the enclosure also includes a ceiling and floor and the interference generating pattern is provided upon at least one of the ceiling or floor.

4. The method of claim 3 wherein the interference generating pattern is made of an inorganic material that is provided in a paint or coating onto the wall(s) and ceiling or floor of the enclosure.

5. The method of claim 3 wherein the enclosure is a building that includes exterior windows and doors and the interference generating pattern is provided adjacent to or upon at least one of the windows or doors.

6. The method of claim 5 wherein the interference generating pattern is provided upon a cloth or fabric that is located adjacent the windows or doors of the enclosure.

7. The method of claim 1 wherein the environment is a box having a top, bottom and sides each of which is provided with the interference generating pattern.

8. The method of claim 1 wherein the interference generating pattern is configured to attenuate radio frequency radiation in the range of 800 to 2400 MHZ.

9. The method of claim 8 which further comprises superimposing a plurality of interference generating patterns to attenuate the entire range of radio frequency radiation.

10. The method of claim 1 wherein the interference generating pattern includes a compound of silicon and carbon and the radio frequency signal is reduced by at least 20 to 30 dB.

11. A substantially radio frequency radiation-free environment that includes a non-conductive interference generating pattern that is or includes a diffraction grating adjacent thereto in a position between the environment and a source of radio frequency radiation signals so as to substantially reduce or interfere with such signals by attenuation of signal wavelength to prevent typical operation of telecommunication devices therein.

12. The environment of claim 11 wherein the environment is an enclosure having a ceiling and one or more walls, and the interference generating pattern is made of an inorganic material that is provided in a paint or coating onto the wall(s) and ceiling or floor of the enclosure.

13. The environment of claim 12 wherein the enclosure is a building that includes exterior windows and doors and the interference generating pattern is provided adjacent to or upon al least one of the windows or doors.

14. The environment of claim 13 wherein the interference generating pattern is provided upon a cloth or fabric that is located adjacent the windows or doors of the enclosure.

15. The environment of claim 11 in the form of a box having a top, bottom and sides each of which is provided with the interference generating pattern thereon.

16. The environment of claim 11 wherein the interference generating pattern is configured to attenuate radio frequency radiation in the range of 800–2400 MHZ.

17. The environment of claim 16 wherein a plurality of interference generating patterns are superimposed to attenuate the entire range of radio frequency radiation.

18. The environment of claim 11 wherein the interference generating pattern includes compounds of silicon and carbon and the radio frequency signal is reduced by at least 20 to 30 dB.

19. A radio frequency reducing building material that includes a non-conductive interference generating pattern that is or includes a diffraction grating to substantially reduce or interfere with radio frequency signals by attenuation of signal wavelength to prevent typical operation of telecommunication devices when the radio frequency reducing building material is positioned between a source of such signals and telecommunications devices.

20. The building material of claim 19 wherein the interference generating pattern is made of an inorganic material that is provided in a paint or coating on a surface of the building material.

21. The building material of claim 20 in the form of paper, cloth, plastic film, plywood, a cement or concrete structure, metal or plastic siding, glass, wallboard or sheetrock.

22. The building material of claim 19 in the form of sheetrock or a cement or concrete structure wherein the interference generating pattern is provided within the building material.

23. The building material of claim 19 wherein the interference generating pattern is configured to attenuate radio frequency radiation in the range of 800–2400 MHZ.

24. The building material of claim 19 wherein a plurality of interference generating patterns are superimposed to attenuate the entire range of radio frequency radiation.

25. The building material of claim 19 wherein the interference generating pattern includes compounds of silicon and carbon and the radio frequency signal is reduced by at least 20 to 30 dB.

* * * * *

UNITED STATES PATENT AND TRADEMARK OFFICE
CERTIFICATE OF CORRECTION

PATENT NO. : 6,785,512 B1  Page 1 of 1
DATED : August 31, 2004
INVENTOR(S) : Messano et al.

It is certified that error appears in the above-identified patent and that said Letters Patent is hereby corrected as shown below:

<u>Title page,</u>
Item [56], References Cited, U.S. PATENT DOCUMENTS, please insert:
-- 4,772,760    *    9/1988    Graham ............................. 174/35R
   4,822,966    *    4/1989    Matsubara .......................... 219/730
   4,845,310    *    7/1989    Postupack .......................... 174/35R
   5,885,911    *    3/1999    Ashcraft et al. ..................... 442/117
   6,197,408    *    3/2001    Kanbara et al. ..................... 428/209 --

<u>Column 8,</u>
Line 21, change "upon al least" to -- upon at least --.

Signed and Sealed this

Nineteenth Day of October, 2004

JON W. DUDAS
*Director of the United States Patent and Trademark Office*